United States Patent

Dezonno

[19]

[11] Patent Number: 5,854,832
[45] Date of Patent: Dec. 29, 1998

[54] MONITORING SYSTEM AND METHOD USED IN AUTOMATIC CALL DISTRIBUTOR FOR TIMING INCOMING TELEPHONE CALLS

[75] Inventor: Anthony J. Dezonno, Downers Grove, Ill.

[73] Assignee: Rockwell International Corp., Seal Beach, Calif.

[21] Appl. No.: 494,898

[22] Filed: Jun. 26, 1995

[51] Int. Cl.⁶ ............................. H04M 15/00; H04M 3/00
[52] U.S. Cl. ......................... 379/111; 379/265; 379/266; 379/309
[58] Field of Search ...................... 379/111–115, 216, 379/265, 266, 309, 92, 190.67, 191.88, 197.89, 202, 205; 704/246, 248, 253

[56] References Cited

U.S. PATENT DOCUMENTS

| | | | |
|---|---|---|---|
| 4,201,896 | 5/1980 | Bower et al. | 379/67 |
| 4,850,007 | 7/1989 | Marino et al. | 379/112 |
| 4,858,120 | 8/1989 | Samuelson | 379/309 |
| 5,185,780 | 2/1993 | Leggelt | 379/113 |
| 5,214,688 | 5/1993 | Szlam | 379/112 |
| 5,241,584 | 8/1993 | Hardy et al. | 379/113 |
| 5,247,569 | 9/1993 | Cave | 379/266 |
| 5,299,260 | 3/1994 | Shoio | 379/265 |
| 5,335,268 | 8/1994 | Kelly | 379/112 |
| 5,381,467 | 1/1995 | Rosinski | 379/111 |
| 5,404,400 | 4/1995 | Hamilton | 379/92 |
| 5,425,087 | 6/1995 | Gerber et al. | 379/113 |
| 5,448,624 | 9/1995 | Hardy et al. | 379/113 |
| 5,448,625 | 9/1995 | Lederman | 379/112 |
| 5,563,933 | 10/1996 | August | 379/115 |
| 5,568,541 | 10/1996 | Greene | 379/111 |

OTHER PUBLICATIONS

AT&T Network Systems, "5ESS Switch ACD/MIS" Issue 2, Aug. 1990.

*Primary Examiner*—Vijay Shankar
*Attorney, Agent, or Firm*—Welsh & Katz, Ltd.

[57] ABSTRACT

A monitoring system (200) and method for an automatic call distributor (100) which selectively interconnects an incoming telephone call from a caller and one of a plurality of agents are provided. The monitoring system (200) detects a length of time the agent is talking and a length of time the caller is talking during the incoming telephone call. Pauses in the incoming telephone call are timed, as is the length of time of the total incoming telephone call. The automatic call distributor (100) contains a first bus (204) on which voice signals from the agent to the caller are transmitted and a second bus (208) on which voice signals from the caller to the agent are transmitted. A digital signal processor (210) monitors the first and second busses (204) and (208) to detect voice signals from the agent and the caller, respectively. The detected information regarding the incoming telephone call is reported to the agent and/or supervisory personnel.

31 Claims, 4 Drawing Sheets

MONITORING SYSTEM AND METHOD USED IN AUTOMATIC CALL DISTRIBUTOR FOR TIMING INCOMING TELEPHONE CALLS

BACKGROUND OF THE INVENTION

The present invention is related generally to monitoring devices for logging and reporting operational data in an automatic call distributor which routes incoming telephone calls from external callers to selected agents and, more particularly, to a monitoring system and method for an automatic call distributor wherein each incoming telephone call is monitored for the amount of time the agent talks, the amount of time the caller talks and the amount of time in which the telephone line is silent.

Automatic call distribution (ACD) systems are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System".

ACD systems provide for acquiring, processing and reporting information concerning different aspects of activity within the system. Typically, this information is presented in printed reports and/or displayed on a data display terminal. Based on this information, management and supervisory personnel are able to evaluate the call activity within the automatic call distributor and, if necessary, make changes for more efficient ACD system operation.

Data is collected on each incoming call offered to the ACD system. This data consists of a log of events occurring in the ACD system over time for an incoming call. Typical logged data elements are receipt of call, call offered to an application, call presented to an agent group, call handled or abandoned and length of call. The data representing these data elements is then processed to generate reports for use by management or supervisory personnel. The data may be organized in any number of ways, such as by agent, telephone trunk, agent groups and the like.

Unfortunately, these prior reporting systems are somewhat limited in the information that can be conveyed to the supervisor. In particular, current systems are unable to provide information regarding the content of the telephone calls. Supervisors, and even the agents themselves, may want to know more detailed information about each call. The amount of time the agent talks, the amount of time the caller talks and the amount of time neither party talks would be advantageous information to the supervisor and/or the agent.

Using this information, for example, agents which are excessively talkative can be identified and appropriate measures taken. Agents may also attempt to limit call length times for very talkative customers based on this information. If the agents are required to recite a sales presentation, the length of the presentation can be monitored and lengthen or shortened as needed.

Accordingly, there is a need in the art for a monitoring system and method for monitoring the operation of an automatic call distributor wherein the monitoring system monitors and reports the amount of time the agent talks, the amount of time the caller talks and the amount of time neither party talks.

SUMMARY OF THE INVENTION

This need is met by the monitoring system and method of the present invention for an automatic call distributor which selectively interconnects an incoming telephone call from a caller and one of a plurality of agents. The length of time an agent talks during a telephone conversation is detected. In addition, the length of time a caller talks during the telephone conversation is also detected. Finally, the length of time neither party is talking during the telephone conversation is detected.

In accordance with one aspect of the present invention, a monitoring system comprises agent detection means for detecting when the one of the agents is talking during the incoming telephone call and agent duration means responsive to the agent detection means for timing a length of time the one of the agents is talking during the incoming telephone call. A reporting means may report the length of time the one of the agents talked during the incoming telephone call and/or the length of time of the incoming telephone call. Call duration means may time a length of time of the incoming telephone call.

In accordance with another aspect of the present invention, a method for monitoring operation of an automatic call distributor which selectively interconnects an incoming telephone call from a caller and one of a plurality of agents is provided. The method comprises the steps of: detecting when the one of the agents is talking during the incoming telephone call; and timing a length of time the one of the agents is talking during the incoming telephone call.

In accordance with yet another aspect of the present invention, a method for monitoring operation of an automatic call distributor which selectively interconnects an incoming telephone call from a caller and one of a plurality of agents is provided. The method comprises the steps of: detecting when the caller is talking during the incoming telephone call; and timing a length of time the caller is talking during the incoming telephone call.

It is thus a feature of the present invention to provide a system and method for monitoring the amount of time an agent talks during an incoming telephone call.

It is also a feature of the present invention to provide a system and method for monitoring the amount of time a caller talks during an incoming telephone call.

These and other features and advantages of the present invention will become apparent from the following detailed description, the accompanying drawings and the appended claims.

DETAILED DESCRIPTION OF THE INVENTION

Figure 1:
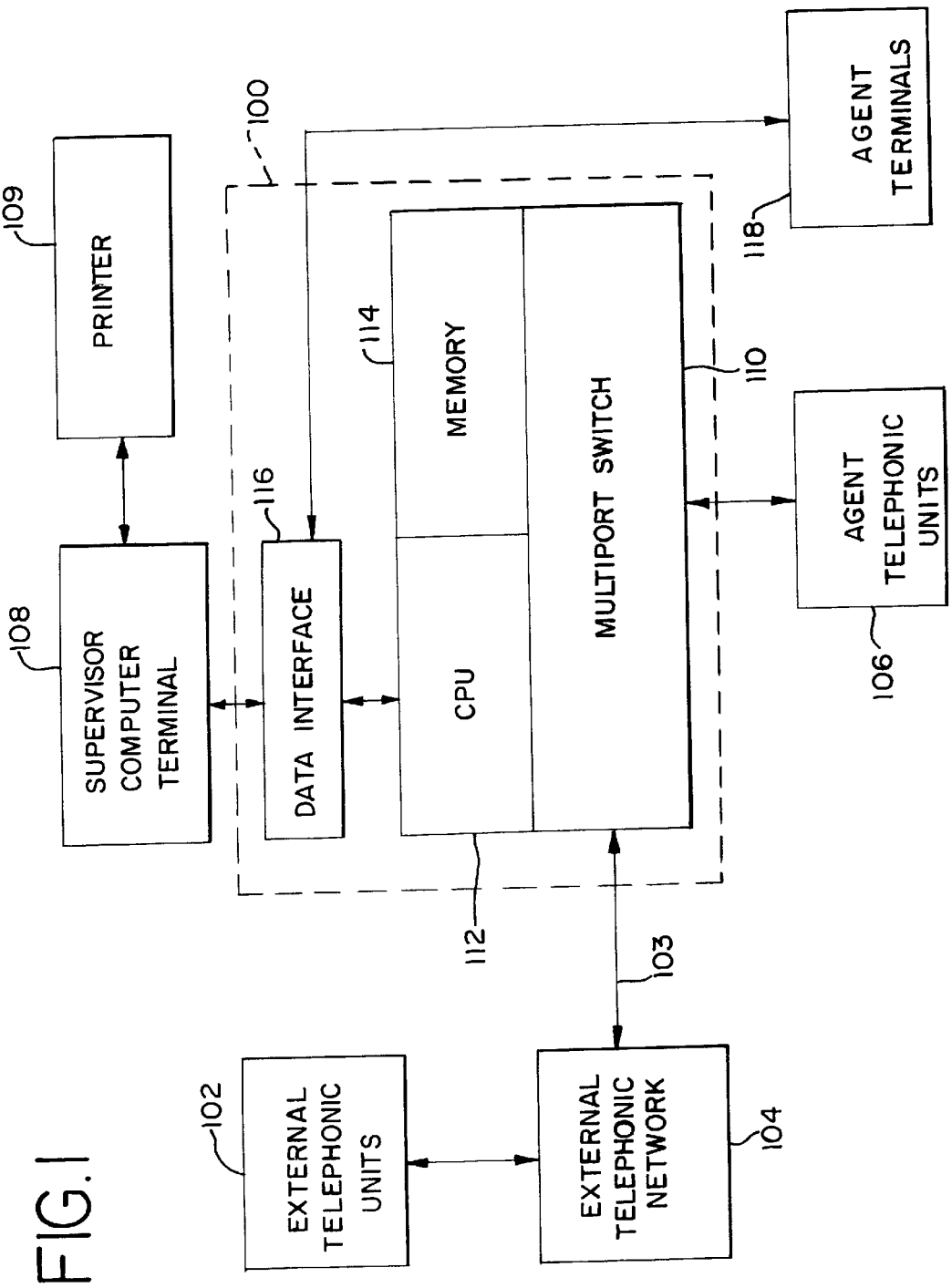
FIG. 1 is a schematic block diagram of an exemplary automatic call distributor connected to an external telephonic network and agent telephonic units in which a monitoring system and method in accordance with the present invention may be advantageously implemented.

An automatic call distributor (ACD) 100 is shown in FIG. 1 in which a monitoring system and method in accordance with the present invention for monitoring incoming telephone calls received by the ACD 100 may be advantageously implemented. The ACD 100 routes incoming telephone calls received from external telephonic units 102 via a telephonic line 103 and an external telephonic network 104 to a plurality of agent telephonic units 106. As will be readily apparent to those skilled in the art, the ACD 100 may be any of a number of different call switching systems, or devices.

The ACD 100 is connected to a supervisor computer terminal 108, which preferably includes a data display unit for displaying information relating to the operation of the ACD 100. The supervisor computer terminal 108 is preferably connected to a printer 109 for generating printed records of the information relating to the operation of the ACD 100. The ACD 100 has a multiport switch 110 for routing incoming telephone calls to selected ones of the agent telephonic units 106. The multiport switch 110 is controlled by a central processing unit (CPU) 112, or other suitable computer circuit, having a memory 114. The CPU 112 is appropriately programmed to route incoming telephone calls through the ACD 100. Preferably, the processing power of the CPU 112 is provided by a 32 bit Motorola 68030 microprocessor.

Agent terminals 118, which may include conventional display units, display information relating to the operation of the ACD 100 to the agents receiving the incoming telephone calls. A data interface 116 provides communications between the CPU 112, the supervisor computer terminal 108 and the agent terminals 118. As will be readily apparent, the structure and philosophy of the above components of the ACD 100 are well known in the art and will not be further discussed herein. Further, other configurations of the ACD 100 can be advantageously employed in the present invention. For example, the agent terminals 118 may be an integral part of the agent telephonic units 106, such as digital displays on a telephone or telephonic console. In this case, the data and the voice signals would be transmitted over a single line to the telephonic console.

Figure 2:
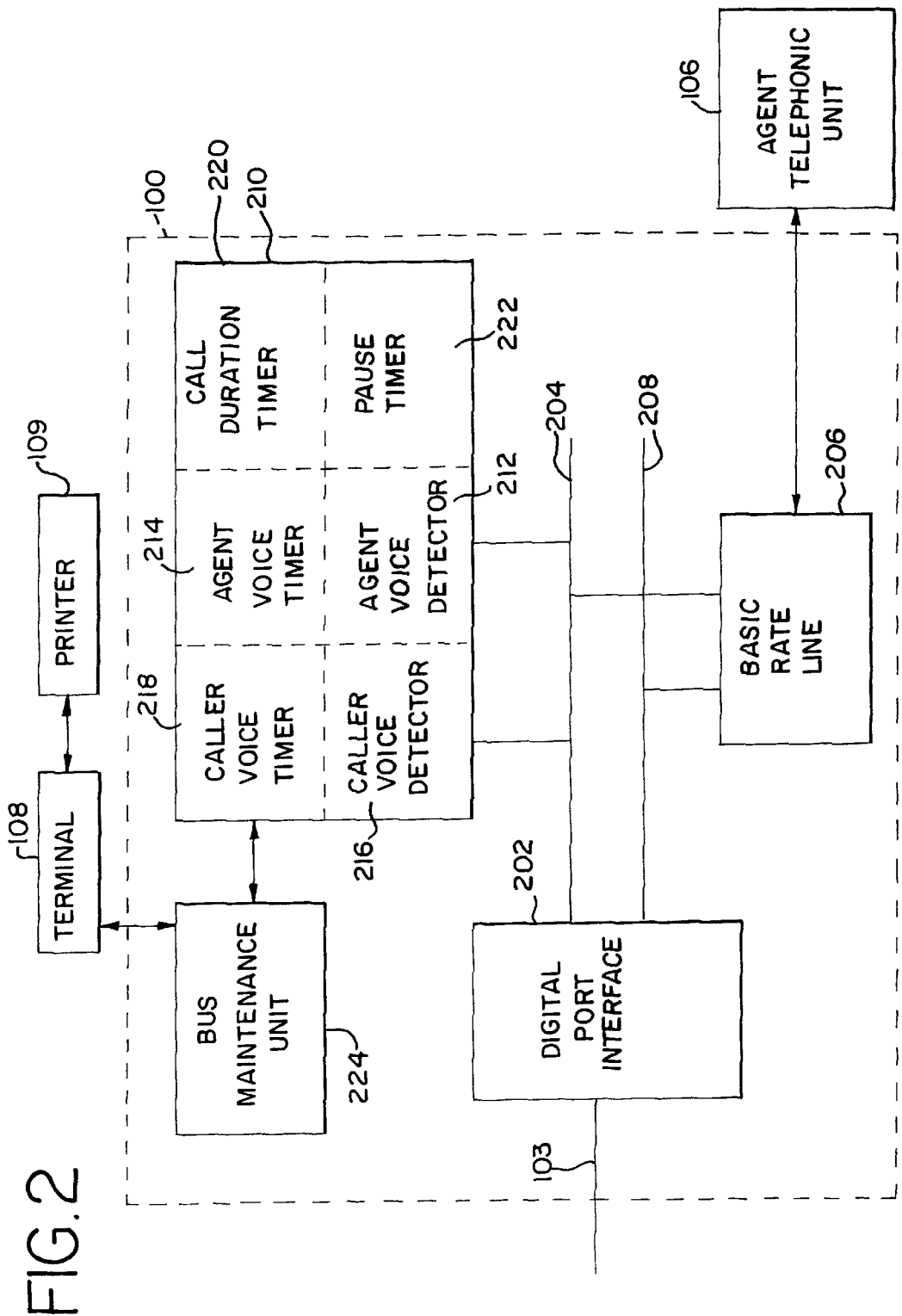
FIG. 2 is a schematic block diagram showing the monitoring system in accordance with the present invention being implemented in the automatic call distributor shown in FIG. 1.

A schematic diagram of a monitoring system 200 within the ACD 100 in accordance with the present invention is shown in FIG. 2. A digital port interface 202 interfaces the ACD 100 and the external telephonic network 104. A first bus 204 transmits voice signals from the digital port interface 202 to a basic rate line interface 206 for transmission to the agent telephonic unit 106. For clarity and ease of description only one agent telephonic unit 106 is shown in FIG. 2. However, it should be understood that the ACD 100 is preferably connected to a plurality of agent telephonic units 106 and one of the units 106 is selected to receive any one incoming telephone call. A second bus 208 transmits voice signals from the basic rate line interface 206 to the digital port interface 202 for transmission to the external telephonic units 102 to establish voice communications between an agent and a caller.

A digital signal processor 210 analyzes signals on the first and second busses 204 and 208. The digital signal processor 210 preferably comprises a compilation of data analyzing circuits which are programmable. The structure and philosophy of a preferred digital signal processor is disclosed in commonly assigned U.S. patent application Ser. No. 08/047,884, entitled "A Functionally Programmable PCM Data Analyzer and Transmitter for Use in Telecommunications Equipment" (attorney docket no. 88CR046C), to Lenihan et al. and having a tentative issue date of Jul. 18, 1995 and tentative U.S. Pat. No. 5,434,981, the disclosure of which is hereby incorporated by reference.

For purposes of the present invention, the digital signal processor 210 comprises agent detection means, such as an agent voice detector 212, for detecting when one of the agents is talking during an incoming telephone call. Typically, the agent voice detector 212 would monitor the signal level on the second bus 208 to detect when one of the agents is talking. If the signal level exceeds a predefined level, the agent is presumed to be talking on the bus 208 and, conversely, when the signal level falls below the predefined level, the agent is presumed silent. Other methods for detecting when the agent is talking are well known as will be readily apparent to those skilled in the art Based on the detection of when the agent talking, an agent duration means, such as agent voice timer 214, determines a length of time the agent talks during a telephone call. For example, the agent voice timer 214 may be activated when the agent voice detector 212 detects the beginning of the agent talking and which is deactivated when the agent voice detector 212 detects the conclusion of the agent talking. As those skilled in the art will readily comprehend, there are numerous manners to implement software and hardware timers and all such timers may be advantageously employed in the present invention. Frequently, the agent may start and stop talking many times over the length of a telephone call. In this case, each of these instances of the agent talking is timed by the agent voice timer 214, as will be discussed further below with respect to FIG. 3.

Similarly, the length of time a caller talks during an incoming telephone call is detected. Caller voice detector 216 monitors the first bus 204 to detect when a caller begins to talk and when a caller quits talking during an incoming telephone call. The caller voice detector 216 preferably monitors the signal level on the first bus 204 to detect when the caller is talking. If the signal level exceeds a predefined level, the caller is presumed to be talking on the bus 204 and, conversely, when the signal level falls below the predefined level, the caller is presumed silent.

Based on the detection of when the caller is talking by the caller voice detector 216, caller duration means, such as caller voice timer 218, determines a length of time the caller talks during a telephone call. For example, the caller voice timer 218 may be activated when the caller voice detector 216 detects the caller beginning to talk and which is deactivated when the caller voice detector 216 detects when the caller quits talking. As with respect to the agent, the caller may start and stop talking many times over the length of a telephone call. Each of these periods in which the caller is talking is timed by the caller voice timer 218.

A call duration means, such as call duration timer 220, detects the beginning and ending of the telephone call and times the length of the complete telephone call. Typically, a call duration timer is started when the telephone conversation begins and is stopped at the completion of the telephone conversation. Many methods are well known in the art for detecting the length of the complete telephone call and will not be further described herein. The length of time that neither the caller nor a agent was talking is detected by the pause duration means, such as pause timer 222. For example, the pause timer 222 may be activated when neither party is talking and deactivated when one of the parties begins talking.

Reporting means, which may comprise a bus maintenance unit 224 consisting of logic circuits for controlling the reporting process, one or more supervisor terminals 108 and one or more printers 109, provides reports relating to the length of time callers and agents talked during one or more incoming telephone calls. In addition, information relating to the total times of the incoming telephone calls may be provided. Those skilled in the art will readily realize that the information obtained above may be reported in any of a number of manners.

Figure 3A:
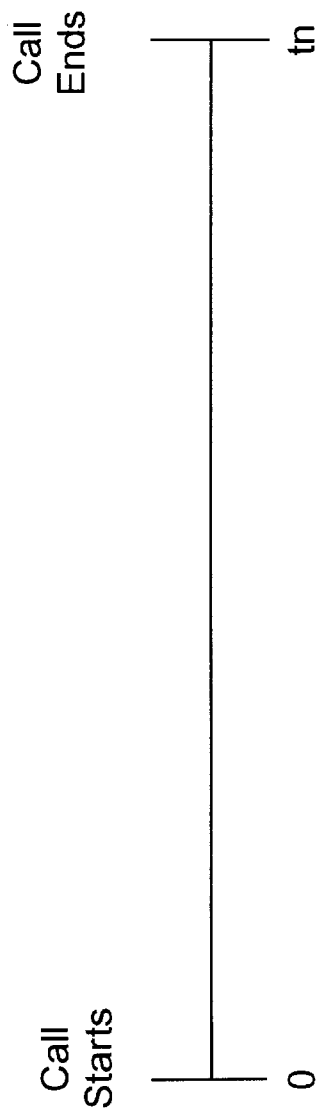
FIG. 3A is a timeline showing a start and end of a telephone conversation.
Figure 3B:
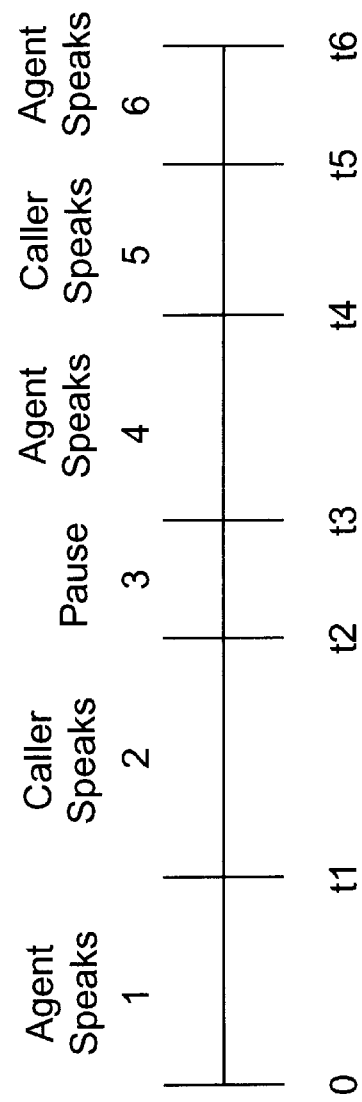
FIG. 3B is a timeline of the telephone conversation shown in FIG. 3A showing time periods in the telephone conversation in which an agent is speaking, a caller is speaking and pause periods where neither party is speaking.

Exemplary time lines for an incoming telephone call is shown in FIGS. 3A and 3B. FIG. 3A shows the call starts time 300 at time 0 and the call stops time 302 at time tn. The call duration timer 220 would thus time the total call length at time tn. FIG. 3B shows time periods during a telephone call wherein the agent is speaking, the caller is speaking or pauses in the conversation.

An exemplary telephone call is shown in FIG. 3B wherein the agent answers the call and delivers a greeting in time period 1 between time 0 and time t1. The length of time period 1 is detected by the agent voice timer 214. The caller speaks in time period 2 between time t1 and t2 and the length of the time period 2 is detected by the caller voice timer 218. In time period 3 between time t2 and t3, neither the agent nor caller is talking and the pause is detected by the pause timer 222. The agent speaks in time period 4 (between times t3 and t4), the caller speaks in time period 5 (between times t4 and t5) and the agent ends the conversation in time period 6 (between times t5 and t6). The agent voice timer 214 detects the lengths of time periods 4 and 6 while the caller voice timer 218 detects the length of time period 5. The total time the agent talked during the above exemplary telephone call is calculated from the equation:

$$\text{Total Agent Speak Time} = t1 + (t4-t3) + (t6-t5) \tag{1}$$

Similarly, the total caller speak time can be calculated from the equation:

$$\text{Total Caller Speak Time} = (t2-t1) + (t5-t4) \tag{2}$$

Figure 4:
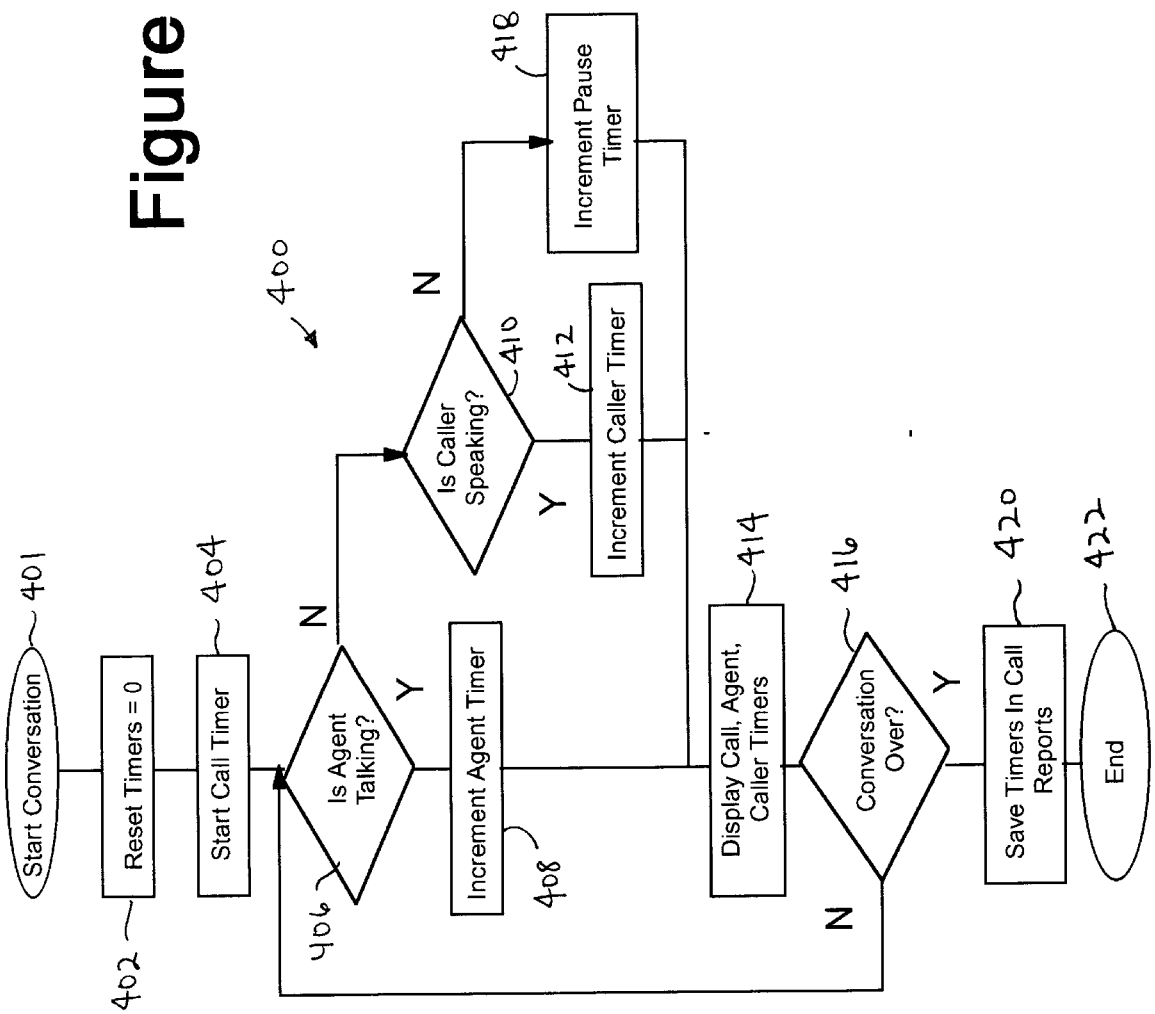
FIG. 4 is a flow chart illustrating the method in accordance with the present invention which may be advantageously implemented in the automatic call distributor shown in FIG. 1.

FIG. 4 is a flowchart 400 showing the steps in the operation of the present invention. The telephone conversation is started at step 401. The caller, agent and call timers are reset to "0", at step 402, and the call timer is started at step 404. At step 406, it is determined whether the agent is speaking. If so, the agent timer is incremented at step 408 and the call, agent and caller timers are displayed at step 414. If the agent is not speaking, it is determined whether the caller is speaking at step 410.

If the caller is speaking, the caller timer is incremented at step 412 and the call, agent and caller timers are displayed at step 414. Preferably, the timer values are displayed on the agent terminals 118 and/or the supervisor computer terminal 108. If the caller is not speaking, neither party is talking and the pause timer is incremented at step 418. The call, agent and caller timers are then displayed at step 414.

It is next determined whether the telephone conversation is ended at step 416. If the conversation has not ended, the flowchart returns to step 406. If the conversation has ended, the timer values are saved to be later reported at step 420. The flowchart then ends at step 422.

In accordance with the present invention, a method for monitoring operation of an automatic call distributor 100 which selectively interconnects an incoming telephone call from a caller and one of a plurality of agents is provided. The method comprises the steps of: detecting when the one of the agents is talking during the incoming telephone call; and timing a length of time the one of the agents is talking during the incoming telephone call. The method may comprises the step of reporting the length of time the one of the agents talked during the incoming telephone call.

Preferably, the step of reporting comprises the step of substantially continually reporting the length of time the one of the agents is talking concomitant to the agent talking to the caller. The method may comprise the steps of: detecting when the caller is talking during the incoming telephone call; and timing a length of time the caller is talking during the incoming telephone call. The method may additionally comprise the step of reporting the length of time the caller talked during the incoming telephone call.

For real-time monitoring of the telephone call, the method may comprise the step of substantially continually reporting the length of time the caller is talking concomitant to the caller talking to the one of the agents. The method preferably comprises the step of timing a length of time of the incoming telephone call. In addition, the method may comprise the step of reporting the length of time of the incoming telephone call.

Having thus described the invention in detail by way of reference to preferred embodiments thereof, it will be apparent that other modifications and variations are possible without departing from the scope of the invention defined in the appended claims. For example, the flowchart may have design configurations which depart from those described herein with reference to the FIG. 4.

What is claimed is:

1. A monitoring system for an automatic call distributor which selectively interconnects an incoming telephone call from a caller and one of a plurality of agents, the monitoring system comprising:

agent detection means for detecting when the one of the agents is talking during the incoming telephone call; and agent duration means responsive to the agent detection means for timing a length of time the one of the agents is talking during the incoming telephone call.

2. The monitoring system as recited in claim 1 comprising reporting means for reporting the length of time the one of the agents talked during the incoming telephone call.

3. The monitoring system as recited in claim 1 comprising call duration means for timing a length of time of the incoming telephone call.

4. The monitoring system as recited in claim 3 comprising reporting means for reporting the length of time of the incoming telephone call.

5. The monitoring system as recited in claim 1 comprising:

caller detection means for detecting when the caller is talking during the incoming telephone call; and caller duration means responsive to the caller detection means for timing a length of time the caller is talking during the incoming telephone call.

6. The monitoring system as recited in claim 5 comprising reporting means for reporting the length of time the caller talked during the incoming telephone call.

7. A method for monitoring operation of an automatic call distributor which selectively interconnects an incoming telephone call from a caller and one of a plurality of agents, the method comprising the steps of:

detecting when the one of the agents is talking during the incoming telephone call; and timing a length of time the one of the agents is talking during the incoming telephone call.

8. The method as recited in claim 7 comprising the step of reporting the length of time the one of the agents talked during the incoming telephone call.

9. The method as recited in claim 8 wherein the step of reporting comprises the step of substantially continually reporting the length of time the one of the agents is talking concomitant to the agent talking to the caller.

10. The method as recited in claim 7 comprising the steps of:
   detecting when the caller is talking during the incoming telephone call; and
   timing a length of time the caller is talking during the incoming telephone call.

11. The method as recited in claim 10 comprising the step of reporting the length of time the caller talked during the incoming telephone call.

12. The method as recited in claim 10 comprising the step of substantially continually reporting the length of time the caller is talking concomitant to the caller talking to the one of the agents.

13. The method as recited in claim 7 comprising the step of timing a length of time of the incoming telephone call.

14. The method as recited in claim 13 comprising the step of reporting the length of time of the incoming telephone call.

15. A method for monitoring operation of an automatic call distributor which selectively interconnects an incoming telephone call from a caller and one of a plurality of agents, the method comprising the steps of:
   detecting when the caller is talking during the incoming telephone call; and
   timing a length of time the caller is talking during the incoming telephone call.

16. The method as recited in claim 15 comprising the step of reporting the length of time the caller talked during the incoming telephone call.

17. The method as recited in claim 16 comprising the step of substantially continually reporting the length of time the caller is talking concomitant to the caller talking to the one of the agents.

18. The method as recited in claim 17 wherein the step of substantially continually reporting the length of time the caller is talking comprises the step of displaying the length of time the caller is talking to the one of the agents during the incoming telephone call.

19. The method as recited in claim 15 comprising the step of timing a length of time of the incoming telephone call.

20. The method as recited in claim 19 comprising the step of reporting the length of time of the incoming telephone call.

21. A voice monitor for an automatic call distributor connected to an external telephone network, the voice monitor comprising:

a) a digital port interface connected to the external telephone network;

b) a first voice bus connected to the digital port interface;

c) at least one agent telephone coupled to the first voice bus;

d) a first voice detector connected to the first voice bus; and e) a first voice timer responsive to the voice detector.

22. The voice monitor of claim 21, wherein the first voice bus comprises an agent voice bus, the first voice detector comprises an agent voice detector, and the first voice timer comprises an agent voice timer.

23. The voice monitor of claim 22, wherein the first voice bus comprises a caller voice bus, the first voice detector comprises a caller voice detector, and the first voice timer comprises a caller voice timer.

24. The voice monitor of claim 21, further comprising a pause timer.

25. The voice monitor of claim 21, further comprising a call duration timer.

26. The voice monitor of claim 21, further comprising:

a) a second voice bus connected to the digital port interface;

b) a second voice detector connected to the second voice bus; and c) a second voice timer responsive to the second voice detector;
   wherein the agent telephone is coupled to the second voice bus.

27. The voice monitor of claim 26, further comprising a pause timer.

28. The voice monitor of claim 26, further comprising a call duration monitor.

29. The voice monitor of claim 26, wherein the first voice bus comprises an agent voice bus, the second voice bus comprises a caller voice bus, the first voice detector comprises an agent voice detector, the second voice detector comprises a caller voice detector, the first voice timer comprises an agent voice timer and the second voice timer comprises a caller voice timer.

30. The voice monitor of claim 29, further comprising a pause timer.

31. The voice monitor of claim 29, further comprising a call duration timer.

* * * * *